United States Patent [19]
Shea

[11] 3,985,973
[45] Oct. 12, 1976

[54] PREFERENCE ACCESS CIRCUIT

[75] Inventor: Donald Ray Shea, Columbus, Ohio

[73] Assignee: Bell Telephone Laboratories, Incorporated, Murray Hill, N.J.

[22] Filed: June 16, 1975

[21] Appl. No.: 587,407

[52] U.S. Cl. .................... 179/18 ET; 340/147 LP
[51] Int. Cl.² .................................. H04Q 3/47
[58] Field of Search .......... 340/147 LP, 152 R, 153; 179/18 ET, 18 EB, 18 G, 18 H, 18 AG, 18 F

[56] References Cited
UNITED STATES PATENTS

| | | | |
|---|---|---|---|
| 2,945,917 | 7/1960 | Clark et al. | 179/27 R |
| 3,300,758 | 1/1967 | Hawley, Jr. | 340/147 LP |
| 3,670,109 | 6/1972 | Leyburn et al. | 179/18 ET |

*Primary Examiner*—Thomas A. Robinson
*Attorney, Agent, or Firm*—C. H. Davis

[57] ABSTRACT

A buffer circuit is disclosed as part of a centralized subsystem in a telephone switching system. The subsystem performs all functions heretofore performed by individual originating registers and communicates with office pretranslators for effecting digit pretranslation. The buffer circuit interfaces a computer of the subsystem with a conventional pretranslator connector for obtaining access to the office pretranslators preferentially over originating registers which are competing for the pretranslators. In response to a single call, the buffer applies a bid for service to each of a plurality of pretranslator connector subgroups in contrast with a bid to a single subgroup from each originating register. In the event the computer receives overlapping calls, the buffer circuit holds the multiple bids for service to preserve their priority status in the queues of the connector subgroups.

14 Claims, 4 Drawing Figures

PREFERENCE ACCESS CIRCUIT

BACKGROUND OF THE INVENTION

My invention relates to switching systems and to a centralized subsystem for use in switching offices for improving the operation of office functions, such as dial tone return, digit reception and pretranslation. More particularly, my invention relates to a buffer circuit in the foregoing subsystem and which is effective for obtaining access for the subsystem to conventional office circuits and preferentially over other conventional office circuits which are competing with the subsystem.

In order to provide high quality service at low cost it is necessary that switching facilities, requiring large investments of time and money, be utilized for many years before they are replaced with improved facilities. Because of the long life of these facilities and the rapid technological advances in the art, it is desirable periodically to upgrade existing systems with improvements that can reasonably be retrofitted therein.

Once example of the foregoing occurs in switching offices, such as described in U.S. Pat. No. 2,585,904 of Feb. 19, 1952 to A. J. Busch, in which certain initial call functions, such as dial tone return, digit reception and control functions associated therewith, are standardly performed by individual originating registers. Although these registers operate satisfactorily, each one is required to complete certain control functions which could more advantageously be performed by a centralized control arrangement, thereby circumventing the necessity of providing redundant and expensive control circuitry in those originating registers added for growth purposes.

This specification discloses, by way of example, a computerized subsystem for performing the functions of originating registers and with improved operation. The subsystem comprises a plurality of pulse receivers, each having only minimum operative functions, and being controlled by a computer where all subsystem control functions reside. One of the functions performed by originating registers and now consolidated in the computer includes the determination on each arriving call as to whether a pretranslation is required of the initially received called party digits in order to determine the total number of such digits the office should expect. In conventional practice, each originating register interfaces with a conventional office connector through which access is gained to a pretranslator for obtaining the pretranslated information. The subsystem interfaces with the same connector for gaining access to the pretranslator. In serving a call, each office register competes with other registers for connector access on an equal basis. The subsystem, on the other hand, operates for simultaneously serving a plurality of calls and must therefore be afforded preferential connector treatment over the registers in order to obtain its equitable share of pretranslator services.

To elaborate, the connector, with which the register and subsystem communicate, comprises three independent subgroups. For providing for balanced traffic loading and increased reliability, the registers are assigned in approximately equal numbers to each subgroup with each register dedicated to only one subgroup. In this system arrangement, known techniques of achieving connector preference for the subsystem have proven to be inadequate. For example, subsystem preference could be achieved by assigning all registers to two of the three connector subgroups, thus reserving the third subgroup exclusively for serving the subsystem. Such an arrangement, however, injures the office traffic balance through the connector. Moreover, this arrangement decreases reliability in that a single failure of the third connector subgroup destroys the ability of the subsystem to obtain any of its pretranslation needs. Other preference arrangements are deemed unsatisfactory because of the foregoing traffic balancing and reliability criteria and because those arrangements undesirably require extensive modification of existing office equipment. I solve the foregoing problems by providing a novel buffer circuit for interfacing the control computer of the subsystem with the pretranslator connector so as to provide preferential access for the subsystem and, importantly, without sacrificing reliability or traffic balancing and without requiring any modification of the connector or other existing office circuits.

SUMMARY OF THE INVENTION

According to one embodiment of my invention, I provide a buffer circuit for interfacing a subsystem with a plurality of servers and arranged for obtaining preferential treatment from the servers over other circuits which are competing for service with the subsystem. The arrangement provides for substantially balanced service from the servers for the subsystem and for the other circuits according to the relative needs of each. The buffer includes circuitry which is responsive to a single subsystem service request for activating bids for service to each of the servers. As a result, the request may be served by any of the servers which is first to respond to the bids. Furthermore, the buffer includes other circuitry for holding activated the foregoing bids thereby to maintain in the servers a priority bid status based upon the time of the initial bid activations for serving a subsequently received request.

By way of example, I disclose in a switching system a buffer circuit for interfacing a computerized originating register subsystem and a conventional pretranslator connector so as to obtain access preferentially through the connector to a plurality of pretranslators over conventional originating registers which also compete with the subsystem for such access. The buffer comprises, as one means of obtaining preferential connector treatment, circuitry for simultaneously activating bids for service in response to one call to each of a plurality of sequentially activated pretranslator connector subgroups. This arrangement is in contrast to the conventional interfacing of originating registers to the connector in which individual registers are dedicated for service to a single subgroup. Each subgroup, when activated, operates for connecting a bidding circuit, e.g., the subsystem buffer or an originating register, to a pretranslator only if that circuit's bid has achieved priority status over all other bidding circuits in the activated subgroup's queue. The buffer arrangement advantageously operates to accept service from any one of the connector subgroups which first responds to the plural bids. Accordingly, the subsystem is afforded preferential treatment over conventional competing originating registers that are constrained to accept service only from the subgroup to which each register to dedicated.

In addition, I provide buffer preference bid holding circuitry for further enhancing the treatment afforded the subsystem by the connector subgroups. My holding circuitry is activated by the subsystem's control computer illustratively in the event overlapping calls requiring pretranslation are received. When activated, the holding circuitry operates for maintaining bids to the connector subgroups after completion of pretranslation operations pertaining to the first received call. For serving the subsequent call, the held bids maintain a preference status in the queues of each of the connector subgroups that did not respond for serving the first call. Desirably, this bid status is based upon the time of initial activation of the bids and not upon the time of arrival of the subsequent overlapping call.

Other features of the buffer include control relays operated by the control computer and subcircuit logic for effecting the foregoing bidding and holding operations. Additional circuitry is provided for transferring data and miscellaneous communicative signals to and from the computer and the pretranslator connector.

DESCRIPTION OF THE DRAWING

My invention will be better understood by reading the following detailed description of one exemplary embodiment thereof in which.

DETAILED DESCRIPTION

Figure 1:
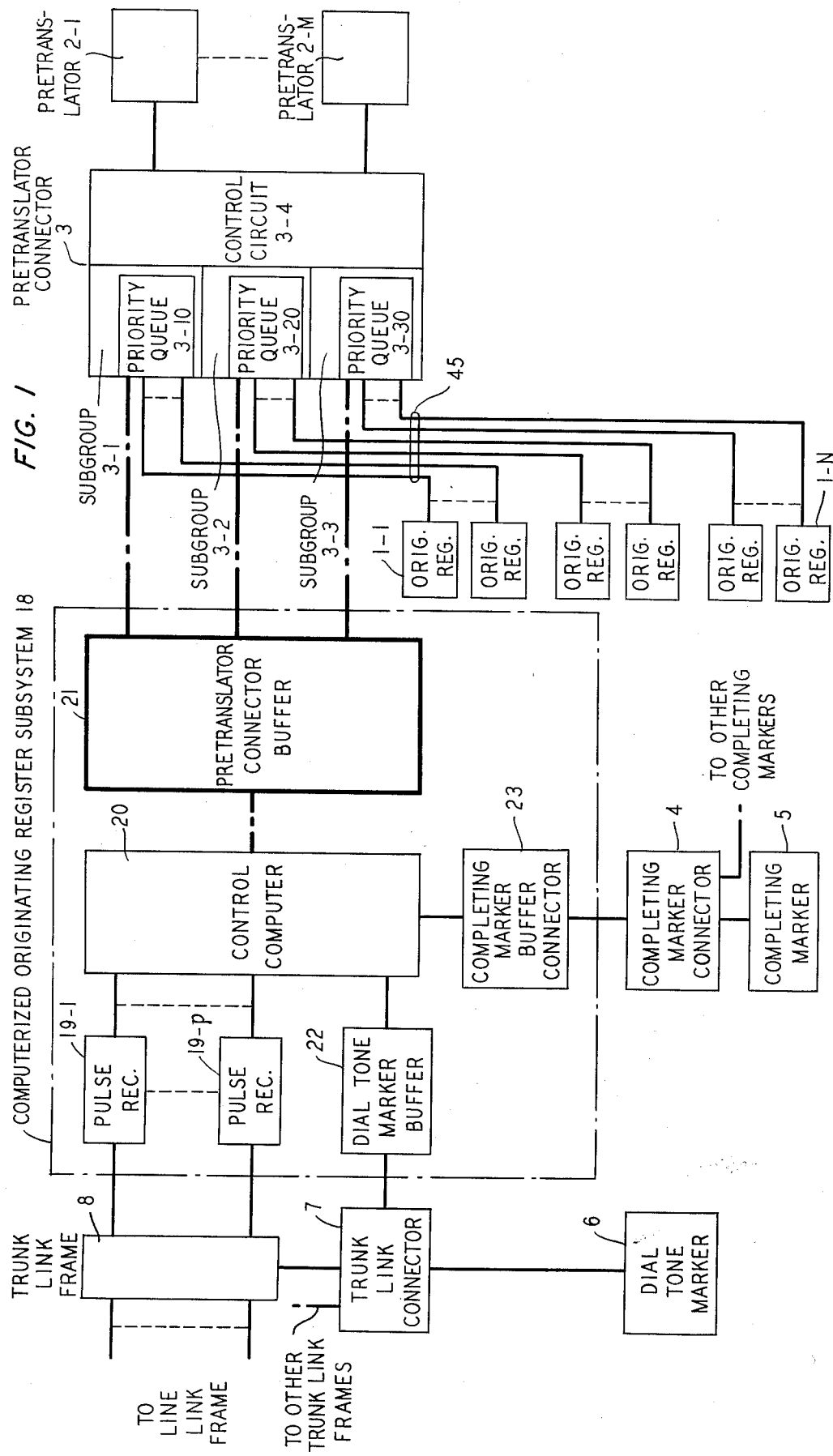
FIG. 1 illustrates a computerized originating register subsystem including a preference access buffer circuit as incorporated into a typical switching office, and FIGS. 2 and 3 when arranged according to FIG. 4 disclose the circuit details of one exemplary buffer circuit incorporating the foregoing preferential service arrangements.

In FIG. 1, there is shown by way of example, a computerized subsystem 18 incorporate within a conventional switching office and arranged for performing all functions heretofore performed by the originating registers 1-1 to 1-N. The conventional circuits include pretranslators 2-1 to 2-M and other control circuits exclusive of subsystem 18 and employed, among other functions, for pretranslating the initial digits of called party numbers to enable a determination by the office of the number of digits to be expected on each call. In order to appreciate a detailed description of the subsystem 18 and my invention it is necessary for the reader to have a general understanding of the operations of the conventional circuits of FIG. 1. Accordingly, a brief description follows. The reader is referred to the Busch patent U.S. Pat. No. 2,585,904 for a description of the Overall illustrative switching system and to R. C. Avery, U.S. Pat. No. 2,680,781, of June 8, 1954, for more specific details of the operation of that conventional portion of the system disclosed in FIG. 1.

For our purpose and excluding the subsystem 18, the circuits of FIG. 1 operate for interfacing a plurality of originating registers 1-1 to 1-N with a lesser plurality of pretranslators 2-1 to 2-M for pretranslating the initially received digits of called party numbers. An incoming call is associated with an idle one of originating registers 1-1 to 1-N for returning dial tone to a call originator and for thereafter accepting the called party digits which are dialed by the originator. After receiving, by way of example, the first three digits, the selected originating register communicates via the pretranslator connector 3 for having these digits pretranslated by one of pretranslators 2-1 to 2-M into an indication of the number of digits to be expected from the call originator. After obtaining the pretranslated results, the originating register operates for accepting the remaining called party digits and for thereafter giving control via completing marker connector 4 to completing marker 5 for establishing final connections to the desired party. The connections from registers 1-1 to 1-N to marker connector 4 are not shown for simplicity.

To elaborate, a dial tone marker 6 is associated with each call origination for controlling the establishment of connections to an idle originating register. Marker 6 operates through a trunk link connector 7 for ascertaining one trunk link frame (TLF), such as TLF 8, on which at least one idle originating register is terminated. The connections from TLF 8 is the originating registers 1-1 to 1-N are not shown for simplicity. Marker 6 proceeds via trunk link connector 7 to locate a specific idle register on the TLF 8 and to establish connections through the TLF to the selected register. The seized register returns dial tone to the originator and prepares to accept and store the incoming called party digits as they are received. After three initial digits have been received, the register initiates operations with pretranslator connector 3 in order to obtain access to one of the pretranslators 2-1 to 2-M.

Pretranslators connector 3 comprises three independent subgroups 3-1 to 3-3, which are activated sequentially and cyclically by its control circuit 3-4 for serving bids for access from each of the originating registers 1-1 to 1-N. In order to improve reliability and to balance traffic loads, the office registers 1-1 to 1-N are divided into three substantially equal size groups and each group assigned to only one of the connector subgroups. A connector subgroup, e.g., subgroup 3-1, when activated, operates for serving only one bid, the then highest priority bid, for pretranslation from among a potential plurality of such bids from registers which are assigned to that subgroup. After an activated subgroup serves the one bid, connector control circuit 3-4 sequentially activates the next subgroup, e.g., subgroup 3-2, which operates for serving its highest priority bid. For determining which bid has priority, each connector 3 subgroup includes a priority queue circuit, such as queue circuit 3-10 in subgroup 3-1, which operates for assigning relative priorities to bidding originating registers according to one relative times that the bids are placed by the competing registers. An originating register initiates a bid by placing a steady-state signal on an appropriate one of the leads of bus 45 which extends from the register to the assigned subgroup 3-1 to 3-3. As a result of the bid, a queue status is reserved in that subgroup as long as the bid signal is maintained. Each subgroup, when activated, operates to select its then highest priority bid and to cooperate with control circuit 3-4 to cut-through all necessary connections between that originating register and a selected one of pretranslators 2-1 to 2-M. The data to be pretranslated is communicated from the register and via control circuit 3-4 to the pretranslator and the pretranslated results are thereafter returned to the register. The register in question, using the results to determine the total number of digits expected from the call originator, collects the digits and, when all are received, hands-off the digits and control of the call via a marker connector 4 to a completing marker 5. The marker 5 proceeds to establish final connections to the desired party in a conventional manner.

With the above as background, the operation of subsystem 18 in FIG. 1 may be understood.

Subsystem 18 comprises a plurality of pulse receivers 19-1 to 19-P, each of which operates under control of computer 20 for performing the fundamental tasks normally performed by originating registers. Pulse receivers 19 are extremely simplified in comparison to conventional originating registers in that all control functions are delegated to computer 20. Particularly, computer 20 operates in conjunction with a dial tone marker buffer 22 for allowing seizures of idle ones of pulse receivers 19 on originations of incoming calls and without requiring modifications of the conventional interfacing office circuits. Computer 20 also performs such functions as determinations of needs for pretranslation of incoming digits which are received by a pulse receiver 19. For obtaining pretranslator services in response to such determinations, computer 20 interfaces with the pretranslator connector buffer 21, which, in turn, provides for access to the pretranslator connector 3 and preferentially over the competing registers 1-1 to 1-N. Finally, computer 20 cooperates with a completing marker buffer connector 23 which provides access to conventional completing markers, such as marker 5, through a completing marker connector 4 for completing final connections to link calling and called parties.

Seizures of receivers 19-1 to 19-P are performed in an identical manner as are seizures of originating registers 1-1 to 1-N insofar as concern the operations of office circuits external to subsystem 18. Initially, dial tone marker 6 is activated in a conventional manner upon seizure of a calling party's line circuit. The dial tone marker 6, in response to a line circuit seizure, examines ones of trunk link frames, such as TLF 8, for ascertaining one such frame having thereon an appearance of at least one idle receiver 19 or originating register 1. Assuming that marker 6 locates an idle receiver 19 first, marker 6 seizes the idle receiver via trunk link connector 7 and TLF 8 and thereafter transmits information to computer 20 via dial tone marker buffer 22 for identifying the seized receiver 19. Dial tone marker 6 establishes a connection between the TLF 8 input appearance on which the incoming call is present and an outgoing appearance on which the seized receiver 19 terminates. Thereafter, dial tone marker buffer 22 releases from the call and control operations are transferred to computer 20.

Computer 20 controls the seized receiver 19 to return dial tone to the call originator and thereafter accepts and stores the called party digits as they are received and repeated thereto by the receiver 19. After the first three digits, by way of example, are received, computer 20 makes a determination as to whether or not pretranslation is required. Assuming that it is, computer 20 controls buffer 21 to initiate bidding actions for service to each of the pretranslator connector subgroups 3-1 to 3-3. As a result, a bid is registered in the priority queues 3-10, 3-20 and 3-30 of each of the connector 3 subgroups. Recalling that the connector 3 subgroups are sequentially activated for serving bids, one of these subgroups 3-1 to 3-3 is first to respond to the plural bids according to the relative priority of each bid in those priority queues. The responding subgroup operates to establish connections between the buffer 21 and one of pretranslators 2-2 to 2-M which is selected by connector control circuit 3-4 for performing the pretranslation. The digits to be pretranslated are passed through buffer 21 to the selected pretranslator in a manner identical to that for the registers 1-1 to 1-N and thereafter, the pretranslated results are returned to buffer 21 and handed-off to computer 20.

After the proper number of called party digits have been received by computer 20, as determined by the pretranslated results, computer 20 passes all digits to a completing marker 5 via completing marker buffer connector 23 and a completing marker connector 4. The marker 5 then proceeds to complete the call in a conventional manner.

Turning now to a discussion of buffer 21, which operates for interfacing computer 20 with the pretranslator connector 3, I provide for preferential subsystem 18 pretranslation treatment in a novel manner. Firstly, buffer 21 has a bidding appearance at each subgroup 3-1 to 3-3 of connector 3, each appearance appearing to connector 3 as only a conventional originating register. Secondly, I provide buffer 21 with a bid holding feature. This feature is activated in the event overlapping calls are received by subsystem 18 and operates to hold a preference status in the connector 3 subgroup priority queues for serving the later call.

Buffer 21 initiates simultaneous bids on each one of its appearances at the connector 3 subgroups in response to a command from computer 20 for obtaining pretranslation for an initial call. Accordingly, a single pretranslation request from computer 20 is afforded an opportunity to be served by any of subgroups 3-1 to 3-3, whereas the originating registers 1-1 to 1-N compete for service only in the particular connector 3 subgroup to which they are assigned. Such plural bids alone provide for preferential treatment for subsystem 18.

Depending upon the sequentially activated state of the connector 3 subgroups 3-1 to 3-3 and on the particular bids from originating registers then present in each subgroup, any one of the subgroups may first respond to the plural subsystem 18 bids. The services of the first responding subgroup are accepted by buffer 21, at which time information representing the originator dialed digits to be pretranslated are transferred from buffer 21 to tehe responding subgroup and thence to one of pretranslators 2. In response to the plural bids, each nonresponding connector 3 subgroup has registered in their priority queues a buffer 21 bid with preferential status therein determined in accordance with the initial time of placing the plural bids. My bid holding feature operates to utilize these bids for preferentially obtaining pretranslation for a subsequent call received by subsystem 18. The bid holding feature is activated by computer 20, in this illustrative embodiment, only in the event concurrent, or overlapping, calls are received by subsystem 18. In this event, after completing pretranslation operations pertaining to the first received call, the upon command from computer 20, buffer 21 operates for holding the bids to the nonresponding connector 3 subgroups for serving the subsequently received call.

It should be understood that the foregoing bid holding feature is not limited to this illustrative embodiment in which the feature is activated only in response to overlapping requests. For example, one variation might involve holding the bids in all events until another connector 3 subgroup responds. At that time, that subgroup could be used to serve a request if then present. If a request is not present, the responding subgroup could then be released. Those skilled in the art no doubt can conceive of other variations within the scope of this teaching.

Figure 2:
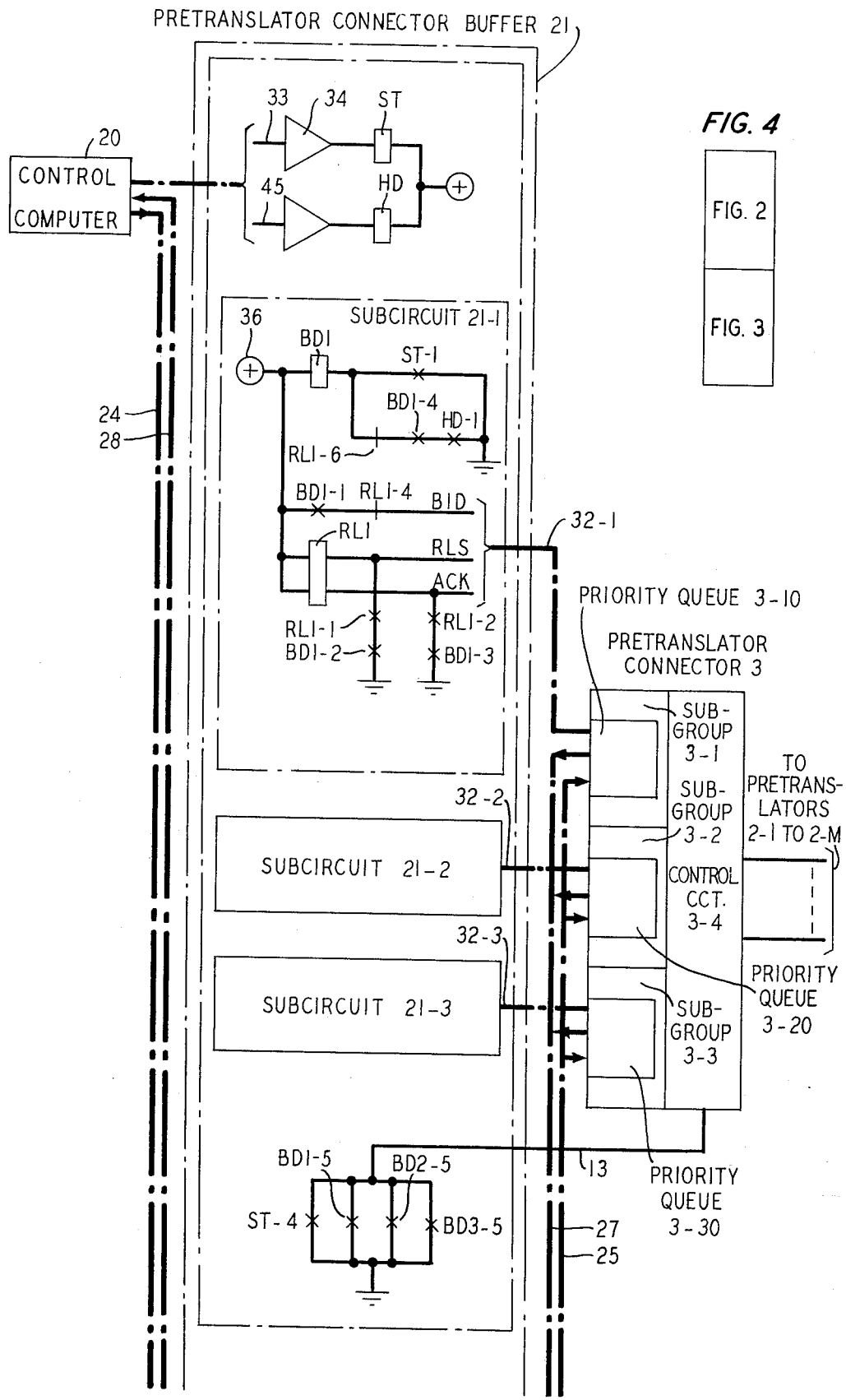
Figure 3:
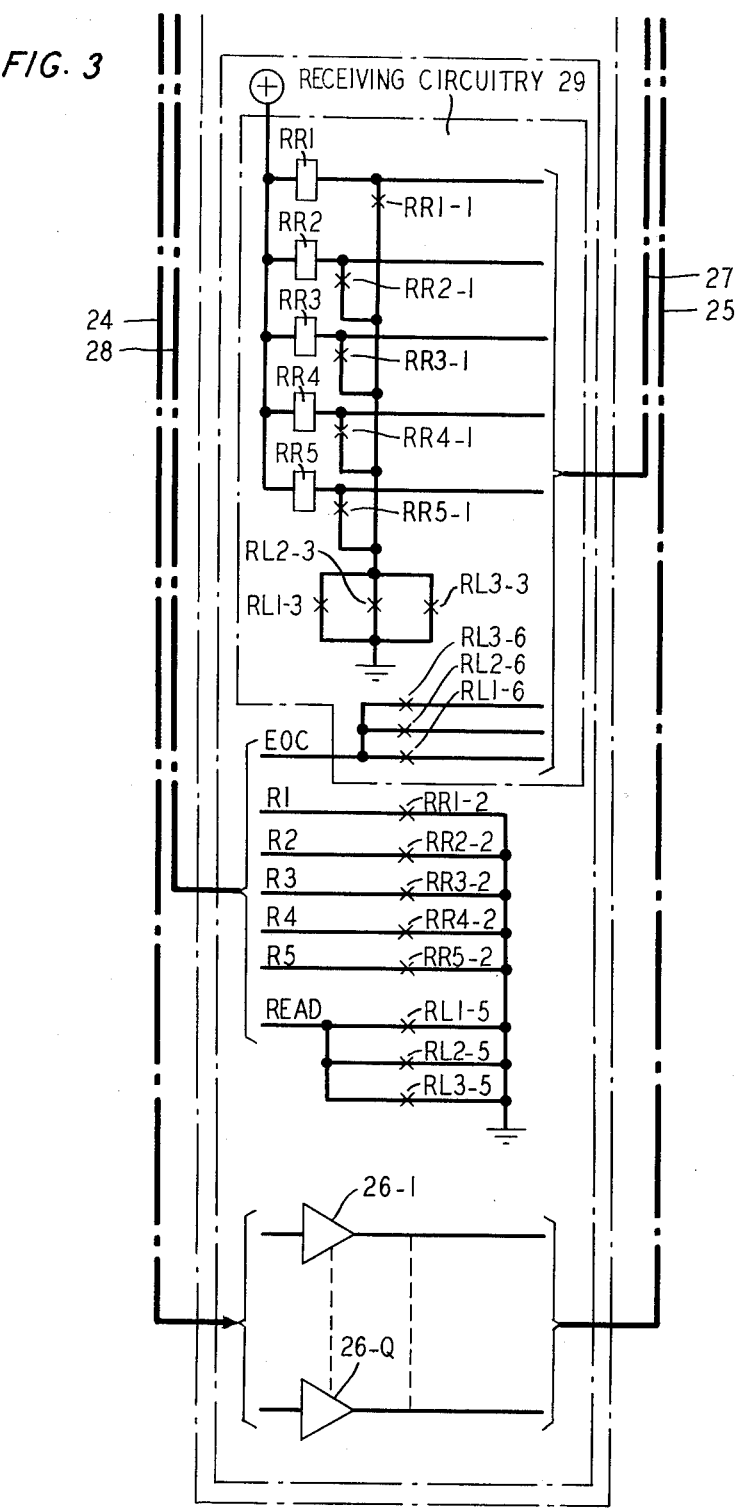

A detailed disclosure of one specific embodiment of buffer 21 is shown in FIGS. 2 and 3 when arranged according to FIG. 4 and which incorporates the above plural bid and preference holding features. FIG. 2 includes the buffer 21 circuitry necessary for realizing the control function interface between computer 20 and the pretranslator connector 3. FIG. 3 contains the data communication interface between computer 20 and the connector 3 and includes the communication paths 24 and 25 and circuits 26-1 to 26-Q for transferring in parallel from computer 20 to connector 3 the data representing the digits to be pretranslated. Other communication paths 27 and 28 and buffer receiving circuitry 29 in FIG. 3 represent the means via which the results are returned to computer 20.

The control circuitry of FIG. 2 includes control relays ST and HD which are operated under control of computer 20 for initiating the plural bidding and preference holding operations. Buffer 21 of FIG. 2 further comprises subcircuits 21-1 to 21-3 which are partially controlled by operations of the above control relays for effectuating the bid and hold operations. Each one of subcircuits 21-1 to 21-3 communicates individually with the separate subgroup of connector 3 for obtaining pretranslator service via that subgroup. The communication signals passed therebetween include a bid signal on lead BID and other signals on leads RLS and ACK on communication paths 32-1 to 32-3 for effecting orderly release operations of a pretranslator 2, connector 3 and buffer 21.

The details of connector 3 and its subgroups are set forth in the Avery patent. The details of the priority queue 3-10 for subgroup 3-1, for example, are set forth in FIG. 9 of that patent. The BID, RLS and ACK leads extending to subgroup 3-1 correspond, respectively, to leads 112, 905 and 114 of FIG. 9 of the patent. The connector 3 is not described further here, as its implementation is unnecessary to an understanding of my invention.

Computer 20, in response to a receipt of digits from one of pulse receivers 19-1 to 19-P in FIG. 1, initiates buffer 21 bidding operations by operating buffer control relay ST in FIG. 2. Simulataneously, computer 20 also presents data representing the initial digits of the called party number to buffer 21 via bus 24 in FIG. 3. This data is routed through amplifying circuits 26-1 to 26-Q and appears at input appearances at each connector 3 subgroup via corresponding leads of bus 25. Each buffer 21 subcircuit responds to the operation of control relay ST by placing a bid signal on its lead BID to its associated subgroup of connector 3. The bid signals result in placing a bid in the priority queue of each connector 3 subgroup and which has a priority status therein based upon the time the bid is activated and upon the then present bids from other competing originating registers 1-1 to 1-N in FIG. 1. Simultaneously with the activation of bids, buffer control circuitry in FIG. 2 operates to apply a ground signal to lead 13 extending from buffer 21 to connector control circuit 3-4. This signal is effective for operating a trouble timing circuit in connector 3 so that the connector may initiate automatic recovery action upon a timeout. A timeout occurs only in the event that certain fault conditions specific to this buffer 21 and connector 3 interface tend to lock the connector 3 and preclude further operations. The reader is referred to the Avery patent for additional details wherein lead 13 of my FIG. 2 is identified as lead 111 in Avery's FIG. 15. In FIG. 2, the ground signal is applied to lead 13 when computer 20 activates control relay ST and via contact ST-4 of control relay ST. In addition, the ground signal is applied to lead 13 by contact BD1/5 of subcircuit 21-1 by relay BD1, to be described, and via corresponding contacts BD2-5 and BD3-5 of the bid relays BD2 and BD3 of the buffer subcircuits 21-2 and 21-3. The circuitry of subcircuits 21-2 and 21-3 is not shown in FIG. 2, it being understood that the structure and operation is equivalent to that of subcircuit 21-1.

At the time one of the connector 3 subgroups responds to the foregoing bids, the control circuit 3-4 of connector 3 operates to select one of the pretranslators 2-1 to 2-M and transfers to it the data on bus 25 to be translated. Thereafter, the pretranslator returns the translated results to buffer 21 receiving circuitry 29 in FIG. 3. Signals are then exchanged between the selected pretranslator and the appropriate one of the buffer 21 subcircuits via the responding connector 3 subgroup and its associated bus 32-1, 32-2 or 32-3 for effecting an orderly termination of communications between buffer 21, connector 3 and the selected pretranslator. One purpose of the signal exchange is to allow a sufficient interval for buffer 21 to lock-in the pretranslated results into the receiving circuitry 29 of FIG. 3. Another purpose is for causing a termination of the bid signal on lead BID from the appropriate buffer 21 subcircuit to the responding connector 3 subgroup. The bids to the remaining subgroups are maintained at this time in anticipation of an activation of the bid holding feature to described.

Processing of a Single Pretranslation Request

Consider that buffer 21 is in an idle state with all relays of FIGS. 2 and 3 released. In response to an incoming call requiring pretranslation, computer 20 initiates a request for pretranslation of the initial called party digits by applying a potential to lead 33 in FIG. 2. This potential is routed through a relay driver 34 for operating relay ST.

The operation of relay ST results in an operation of a subcircuit bid relay, such as BD1 of subcircuit 21-1, in each of the buffer subcircuits for placing bids to each of the subgroups of connector 3. With reference to buffer subcircuit 21-1, relay BD1 is operated via an obvious path consisting of a potental source 36, relay BD1 and the operated make contact ST-1 of control relay ST to ground. The operation of relay BD1 places a bid potential on lead BID of subcircuit 21-1 via its operated make contact BD1-1 and released break contact RL1-4 of release relay RL1. Release relay RL1 is operated, as will be explained, only after the pretranslated results have been received by buffer 21.

Subcircuit 21-1 and 21-3 each contain analogous circuitry to that described above in subcircuit 21-1, including bid relays BD2 and BD3 (not shown), for placing bids to their respective connector 3 subgroups.

In response to the above plural bids, one connector 3 subgroup responds for providing access to a pretranslator when that subgroup is sequentially activated by its control circuit 3-4 and when the bid therein has attained the highest priority status in its priority queue. Assume for purposes of this discussion that subgroup 3-1 is the responding subgroup. The responding subgroup 3-1 automatically performs connecting operations to cut-through the data leads of bus 25 to one of the pretranslators 2-1 to 2-M. In accordance with conventional operations as described in the Avery patent, the selected pretranslator generates the pretranslated results and returns result signals to the responding connector 3 subgroup. The responding subgroup 3-1 extends these signals via bus 27 to buffer receiving circuitry 29 in FIG. 3 for operating appropriate ones of receiving relays RR1 to RR5. The operated receiving relays are temporarily held operated by the result signals and are locked into the receiving relays as a result of release operations which are described below.

Release of Buffer-Connector-Pretranslator Connections Without Preferential Bid Holding Operations Immediately after the selected pretranslator returns the pretranslation results, the pretranslator initiates operations to release connections between itself and the served circuit, here buffer subcircuit 21-1. Specifically, the pretranslator applies a ground potential to a lead which extends from the pretranslator through connector subgroup 3-1, and which terminates on lead RLS of buffer subcircuit 21-1.

The release signal causes an operation of release relay RD1 in that subcircuit via its upper coil in FIG. 2. A holding path for relay RL1 is created via its make contact RL1-1 and make contact BD1-2 of bid relay BD1 which is still operated as a result of operated control relay ST. Other contacts RL1-2 and BD1-3 of the release and bid relays cooperate to return a ground signal via lead ACK towards connector subgroup 3-1 and the pretranslator for causing the still connected pretranslator to complete all further release operations between itself and connector 3.

In buffer 21, operation of release relay RL1 performs several functions preparatory to a release of buffer 21. First, the pretranslated results are locked into the receiving relays RR1 to RR5 of FIG. 3. For this purpose, operated make contact RL1-3 in FIG. 3 creates a holding path to ground for the operated receiving relays via their own operated contacts RR1-1 to RR5-1. Contacts RL2-3 and RL3-3, which represent the corresponding contacts of the release relays of buffer subcircuits 21-2 and 21-3, are wired in parallel with contact RL1-3 so that, regardless of which; subcircuit is involved in the data transfer, a holding path for the receiving relays RR1 and RR5 is created.

Secondly, operated relay RL1 removes the bid signal on lead BID from subcircuit 21-1 to its respective connector 3 subgroup 3-1 by opening lead BID via break contact RL1-4.

Thirdly, a ground signal is placed on lead READ in FIG. 3 which extends to computer 20 and by an operation of release relay make contact RL1-5. This signal notifies computer 20 that the pretranslated results are available on leads R1 to R5 in FIG. 3, which have thereon appropriate result signals as a consequence of the state of receiving relay contacts RR1-2 through RR5-2. Contacts RL2-5 and RL3-5 of the release relays of the remaining subcircuits are wired in parallel with contact RL1-5 and provide for an activation of lead READ in the event one of the subcircuits 21-2 or 21-3 is involved in the data trasfer.

Fourthly, an operation of release relay RL1 provides for exempting subcircuit 21-1 from preferential bid holding operations which may be initiated by computer 20 after it receives the pretranslation results. This operation is described in the following section.

Finally, an operation of release relay contact RL1-6 partially completes a path on lead EOC in FIG. 3 which extends from connector subgroup 3-1 to buffer subcircuit 21-1. When connections have been released between connector subgroup 3-1 and the selected pretranslator in repsonse to the foregoing signal on lead ACK, this path is totally completed in the connector 3 and a signal applied to lead EOC for notifying computer 20 to release buffer 21. Computer 20 releases buffer 21 by releasing the operation of start relay ST.

Preferential Bid Holding Operations

During the foregoing operations, if a second call requiring pretranslation is received by computer 20, the computer, after receiving the pretranslated results for the first call and immediately before releasing buffer 21, activates buffer 21 preference holding circuitry in order to maintain bids to the nonresponding subgroups of connector 3. After operating the preference holding circuitry computer 20 releases the buffer and immediately thereafter, reoperates it for serving the second call. This release and reoperate operation results in a release and reactivation of the bid potential on lead BID from the served buffer 21 subcircuit and is necessary to restart operations of connector 3.

To elaborate, assume that a second call has arrived before computer 20 has received the results of pretranslation for a first call. Assume further that buffer subcircuit 21-3 and connector subgroup 3-3 is serving the first call. In response to receiving the pretranslation results from connector subgroup 3-3 for the first call, computer 20 applies a signal to lead 45 in FIG. 2 for operating hold relay HD. Contacts of that operated relay complete paths for holding operated the bid relay BD1 in subcircuit 21-1 and the corresponding bid relay BD2 (not shown) in buffer subcircuit 21-2. The holding path for bid relay BD1, for example, consists of break contact RL1-6 of the release relay RL1, make contact BD1-4 of the bid relay and operated make contact HD-1 of hold relay HD. The holding operation is ineffective for creating a holding path for the corresponding bid relay BD3 of responding subcircuit 21-3. This operation of subcircuit 21-3 may be understood by referring to the corresponding circuitry in subcircuit 21-1 wherein the break contact RL1-6 would interrupt the holding path for bid relay BD1 if subcircuit 21-1 were the served subcircuit. The held states of bid relays BD1 in subcircuit 21-1 and BD2 in subcircuit 21-2 result in the maintenance of bid signals on leads BID to the nonresponding connector subgroups 3-1 and 3-2 during the buffer release the reoperate actions that immediately follow the operation of relay HD for restarting connector 3.

The foregoing release and reoperate actions are performed by computer 20 by releasing and reoperating control relay ST. The bids to connector subgroups 3-1 and 3-2 are maintained throughout this restart operation as described and result in maintaining a preferential bid status in the queues of those subgroups. As a result of the reoperation of control relay ST, a new bid is placed on lead BID from the priorly served subcircuit 21-3. However, this new bid is afforded only a preference status in the connector subgroup 3-3 priority queue which relates to the current time of placing the bid thereto.

After the reoperation of relay ST, any one of the connector subgroups 3-1 to 3-3 may respond to the bid thereto when that bid achieves the highest priority status in that subgroup. However, by virtue of the held bids to subgroups 3-1 and 3-2, one of these subgroups is most likely to respond first. At that time, the responding subgroup proceeds with operations identical to those already described for cutting-through connections from the corresponding buffer 21 subcircuit to another pretranslator and for thereafter returning the pretranslated results to the buffer 21.

The foregoing preference holding operations may be utilized for preferentially serving the pretranslation needs of a third call if that call arrives before pretranslation operations pertaining to the second call above are completed. In this event, two subgroups of connector 3 have already operated for serving the prior two calls. The held bid is maintained, therefore, to the third and final nonresponding subgroup of connector 3. The bid holding operations to this final subgroup are similar to those already described. Assuming subcircuits 21-3 and 21-2 to be the subcircuits participating, respectively, in operations pertaining to the first and second calls, subgroup 3-2, after returning the second call pretranslation results, returns a signal on lead RLS for operating release relay RL2 in subcircuit 21-2. The operation of that relay results in a termination of the bid on lead BID from subcircuit 3-2. Thereafter, computer 20 operates holding relay HD and releases and reoperates control relay ST. In a manner as priorly described, the bids to subgroups 3-3 and 3-2 are released and reactivated and result in new bids which have priority based upon the current time of activation in the preference queues of these subgroups. The maintained bid from subcircuit 21-1 to connector subgroup 3-1 spans the release and reoperate actions and, accordingly, reserves its preferential status in that subgroup. Thereafter, the pretranslation needs of the third call may be served by any one of the three connector 3 subgroups, but preferentially by the subgroup 3-1.

It is to be understood that the hereinbefore described arrangements are illustrative of the principles of my invention. In light of this teaching, it is apparent that numerous other arrangements may be devised by those skilled in the art without departing from the spirit and scope of my invention.

What I claim is:

1. A buffer circuit for interfacing a controller to a plurality of access circuits to obtain service from a serving circuit preferentially over a plurality of bid circuits competing for access to the serving circuits, each access circuit being operable to couple at least one of the bid circuits to the serving circuit in response to a bid signal therefrom and being operable to couple said buffer circuit to the serving circuit in response to a bid signal therefrom, said buffer circuit comprising means operated in response to an initial controller service request for activating a bid signal to each one of said access circuits, and means operated in response to a subsequent controller service request for holding activated at least one of said bid signals to maintain in the access circuit associated therewith a priority status based on the time of initial activation of said bid signals for serving the subsequent request.

2. The invention of claim 1 wherein said activating means comprises a plurality of subcircuits each communicative with an associated one of said plurality of access circuits and each said subcircuit including circuitry operated in response to a first command signal from the controller for transmitting an individual bid signal to the associated one of said access circuits, and means operated by a response signal from the associated one of said access circuits for terminating the transmission of said bid signal thereto.

3. The invention of claim 2 wherein said holding means comprises a plurality of bid holding circuits each individually associated with a corresponding one of said subcircuits and each operated in response to a second command from said controller in the absence of said response signal for maintaining a bid signal transmission by its associated subcircuit.

4. In combination in a switching office, a plurality of translators, a plurality of first call registers each for serving one call operation at a time, a plurality of means each for sequentially connecting prescribed ones of said first registers to selected ones of said translators on an equal priority basis and in response to translation request signals from said prescribed first registers, a register subsystem for serving a multiplicity of call operations at any given time and comprising a plurality of second call registers, means for controlling the operations of said subsystem and including means for directing a request signal to each of said connecting means in response to a request for translation of call data received by one of said second call registers, and means for holding activated at least one of said subsystem requests to said connecting means for obtaining access to said translators for call data received by another of said second call registers.

5. In combination, at least two bid serving circuits each having a bid priority queue circuit operative for selecting to serve bid signals thereto on a first-come-first-serve basis, a plurality of first circuits each assigned to one of said serving circuits and being operative for transmitting a bid signal to the queue circuit of its assigned serving circuit, and a second circuit assigned to each of said serving circuits and having means for simultaneously activating a bid signal in each of said queue circuits, and including means for holding active a first said bid from said second circuit in at least one of said queue circuits after a second said bid from said second circuit has attained first priority in another of said queue circuits and at least until said first bid attains first priority in said one of said queue circuits.

6. In combination, a subsystem, a plurality of bid circuits assigned in groups to individual ones of a plurality of server circuits for obtaining service therefrom, wherein each one of said server circuits is sequentially activated for serving a then highest priority bid for service, the improvement comprising circuitry for obtaining server circuit preference for said subsystem over said bid circuits and comprising means operated in response to a first subsystem service request for activating bids for service simultaneously to each of said server circuits, and means operated in response to a subsequent subsystem service request received before completion of the first service request by one of said server circuits first to respond to said bids for holding activated a said bid to a nonresponding one of said server circuits to maintain in said nonresponding server circuit a priority status based on the time of initial activation of said bids for serving said subsequent service request.

7. For use in a switching office containing a plurality of registers, a plurality of translators and a connecting circuit having cyclically activated subgroups for sequentially connecting bidding ones of the registers assigned to individual ones of the subgroups to selected ones of the translators, wherein each subgroup includes a priority gueue circuit for rank ordering the bidding registers on the basis of time of bid activation for connection to a translator, a buffer circuit for interfacing a subsystem with the connecting circuit and arranged for accepting connection by any one of the subgroups to the translators and comprising means operated in response to a first subsystem translation request for simultaneously activating bids for connection in each of the subgroup priority gueue circuits, said activating means including means operable by the subsystem in response to a second subsystem translation request for holding activated at least one of said bids in a queue circuit after completion of said first request for obtaining a translator connection for serving said second request.

8. For use in a system having a plurality of serving circuits, a plurality of first bid circuits and a plurality of cyclically activated connecting circuits, each said connecting circuit being operative when activated for connecting for service a bidding one of the first bid circuits assigned thereto to one of the serving circuits, wherein each connecting circuit includes a priority queue circuit for rank ordering bidding ones of the first bid circuits on the basis of time of bid activation for connection to a serving circuit, a buffer circuit for interfacing a subsystem with the connecting circuits and comprising a plurality of second bid circuits each associated with the separate one of said connecting circuits and having means responsive to a first subsystem request for simultaneously activating a bid for connection in an associated connecting circuit priority gueue circuit, a said second bid circuit including means for terminating a bid activation by said activating means in response to a release signal from an associated connecting circuit, and means operable by the subsystem in response to a second subsystem request for holding a said bid activation after completion of said first request and in the absence of a receipt of said release signal by said second bid circuit for obtaining a connection to a serving circuit for serving said second request.

9. The invention of claim 8 wherein said buffer circuit further comprises control apparatus operated by said subsystem for controlling the bidding and holding operations of each said second bid circuit and wherein a said second bid circuit further includes a first switching device operated by said control apparatus for effecting a steady-state bid signal transmission to an associated connecting circuit priority queue circuit, and a second switching device operated by said release signal for interrupting said bid signal transmission and wherein said first switching device and said control apparatus cooperate with said second device when nonoperated for maintaining an operation of said first device.

10. The invention of claim 8 wherein said second bid circuit further comprises means responsive to a receipt of said release signal for returning to an associated connecting circuit an acknowledge for signal for acknowledging the receipt of said release signal.

11. The invention of claim 8 wherein said buffer circuit further comprises means for transferring data to the connecting circuits and means activated by said terminating means for receiving return signals from the connecting circuits for transfer to the subsystem.

12. The invention of claim 11 wherein said buffer circuit further comprises means operated by said terminating means for notifying the subsystem of the availability of said return signals.

13. In combination, a plurality of serving circuits, a plurality of first service circuits each having access for bidding for service of said serving circuits independently of the others of said first service circuits a plurality of second service circuits, means common to said second service circuits for sequentially controlling the access for bidding of said second service circuits to said serving circuits, and buffer means responsive to bid signals from said first and second service circuits for distributing service from said serving circuits between said first and second service circuits.

said buffer means comprising means responsive to a service request from any one of said first service circuits for transmitting a bid signal to one of said serving circuits and means responsive to an initial service request signal from said controlling means for transmitting a bid signal to a plurality of said serving circuits.

14. The invention defined in claim 13 wherein said buffer means further comprises means responsive to a subsequent service request signal from said controlling means for maintaining the transmission of said bid signals only to selected ones of said serving circuits.

* * * * *

UNITED STATES PATENT AND TRADEMARK OFFICE
CERTIFICATE OF CORRECTION

PATENT NO. : 3,985,973
DATED : October 12, 1976
INVENTOR(S) : Donald Ray Shea

It is certified that error appears in the above-identified patent and that said Letters Patent are hereby corrected as shown below:

Column 2, line 65, "to" should read --is--. Column 3, line 34, "incorporate" should read --incorporated--. Column 4, line 12, "is" should read --to--; line 23, "pretranslators" should read --pretranslator--. Column 5, line 62, "2-2" should read --2-1--. Column 9, line 21, "RD1" should read --RL1--; line 41, delete the semicolon after "which". Column 10, line 47, after "release" change "the" to --and--. Column 14, line 17, after "acknowledge" cancel "for".

Signed and Sealed this

Twenty-second Day of March 1977

[SEAL]

Attest:

RUTH C. MASON
Attesting Officer

C. MARSHALL DANN
Commissioner of Patents and Trademarks